United States Patent [19]

Ishida et al.

[11] Patent Number: 4,836,335
[45] Date of Patent: Jun. 6, 1989

[54] ARRANGEMENT FOR HOLDING OIL SUPPLY IN SHARP-EDGED TOOLS

[75] Inventors: Kimikazu Ishida; Tsuneo Ishida, both of Miki, Japan

[73] Assignee: Saboten Co., Ltd., Hyogo, Japan

[21] Appl. No.: 197,687

[22] Filed: May 23, 1988

[30] Foreign Application Priority Data

Feb. 25, 1988 [JP] Japan .............................. 63-24804[U]

[51] Int. Cl.⁴ ............................................. F16N 19/00
[52] U.S. Cl. .......................................... 184/102; 30/86
[58] Field of Search .......................... 184/102, 109, 64; 30/86, 123, 267, 515

[56] References Cited

U.S. PATENT DOCUMENTS

| 773,743 | 11/1904 | Hoffman | 30/267 |
| 1,537,108 | 5/1925 | Copley | 30/515 |
| 2,265,047 | 12/1941 | Tognola | 184/102 |
| 2,713,694 | 7/1955 | Soldan | 184/102 |
| 4,077,492 | 3/1978 | Inoue | 184/102 |

Primary Examiner—Leonard E. Smith
Assistant Examiner—Robert Blackmon
Attorney, Agent, or Firm—Koda and Androlia

[57] ABSTRACT

An arrangement for holding an oil supply in a sharp-edged tool such as scissors, saws, etc. including a recess provided in the sharp-edged tool and an oil supply comprising an oil absorber and a holder. The oil supply is set in the recess so that it can be removed therefrom. The holder retains the oil absorber therein such that a part of the oil absorber sticks out of the holder. The oil absorber is made from materials which absorb oil. In use, the oil supply is taken out of the recess, and the oil in the oil absorber is applied to the sharp-edged tool when the oil absorber is rubbed along the edge of the blade of the tool.

5 Claims, 5 Drawing Sheets

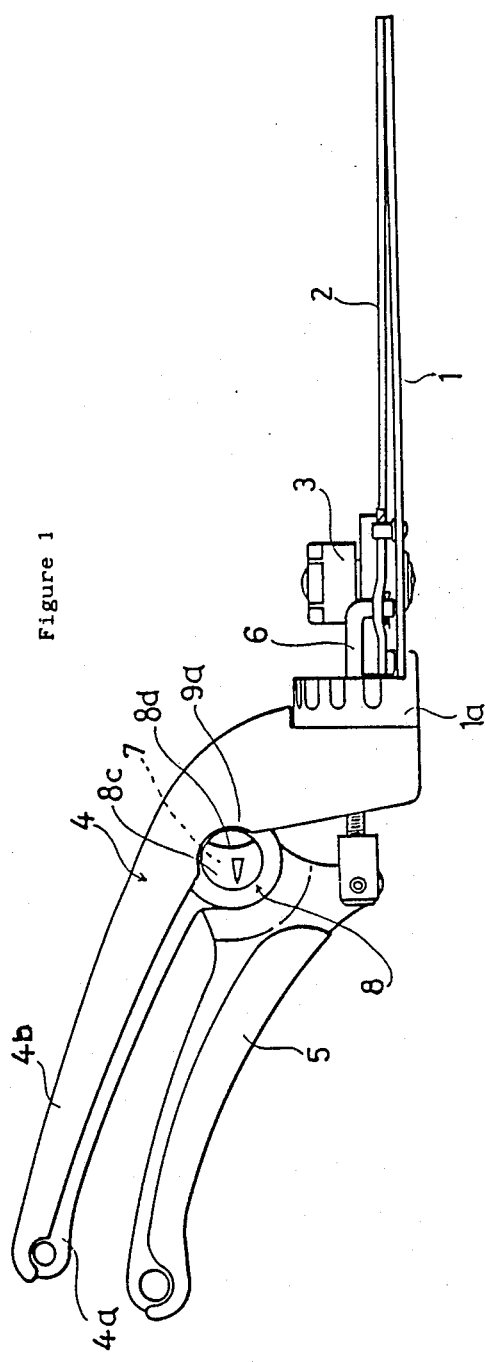
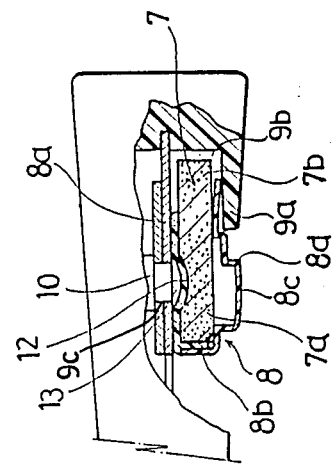
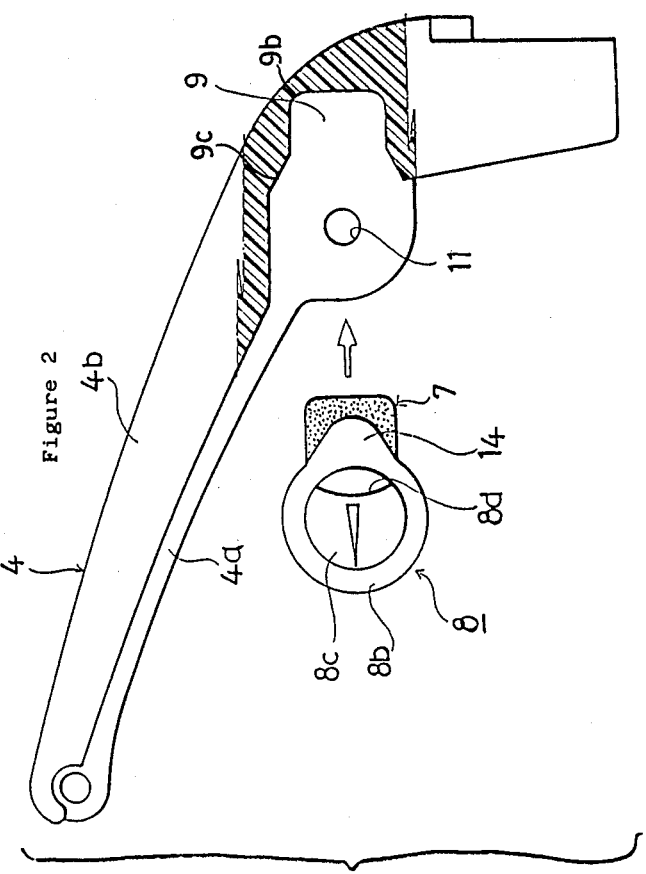

ARRANGEMENT FOR HOLDING OIL SUPPLY IN SHARP-EDGED TOOLS

BACKGROUND OF THE INVENTION

1. Field of the Invention

The present invention relates to an oil supply which is attached to sharp-edged implements and tools such as scissors, saws, etc. so that the dirt and moisture can be prevented from accumulating on the blades.

2. Prior Art

Conventionally, the blade faces and other parts of the sharp-edged implements and tools (hereafter referred to merely as "sharp-edged tool") are wrapped in rust preventive papers when they are transported. The rust preventive paper can be used to wrap the needed parts after each use of the sharp-edged tool. However, no device for applying oil to a sharp-edged tool has been introduced yet.

Dirt and moisture should be removed from the blade of a sharp-edged tool after each use to prevent rusting. However, a sharp-edged tool is often left uncared for because it is troublesome to apply the oil and clean with a waste cloth. Using wrapping papers is also troublesome and insufficient from the maintenance point of view.

SUMMARY OF THE INVENTION

Accordingly, the present invention is provided so that the sharp-edged tool contains a supply of oil, making it possible to apply oil at anytime whenever desired. The oil supply of this invention is, in a desired form, basically made from an oil absorbing material (oil absorber) such as felt, foam, etc. The oil absorber is held in a holder so that a part of the oil absorber can be seen from the outside. The sharp-edged tool is provided with a recess so that the oil supply can be removably fitted therein.

Part of the top wall of the recess where the oil supply is fit is cut away so that the upper surface of the holder may be partially visible. For concave/convex engagement, a concave or convex area is provided in the bottom of the holder and a convex or concave area to be engaged with the concave or convex area may be provided on the bottom surface of the recess.

It is effective to from the holder so that a part of it extends and is provided with a projection in the form of a tongue so that it makes contact with the inner surface of the top wall of the recess. It is also effective to form the bottom surface of the recess, or the bottom surface of the holder, so that it is concave with a large curvature.

The recess does not necessarily have to be formed on the sharp-edged tool, but may be replaced by a recess that is an inner space of a cylindrical body enclosing the oil supply. A cylindrical body is attached to the sharp-edged tool.

The oil supply containing the oil absorber therein made from felt, etc. and permeated with oil is removably set in the recess made in the sharp-edged tool. When it is used, the oil supply is removed from the sharp-edged tool by pushing the upper surface of the oil supply with the fingers and moving it back and forth.

When the oil supply is set in the recess of the sharp-edged tool, the holder of the oil supply is held within the recess with the convex or concave area of the recess engaged with the concave or convex area of the holder. Thus, the oil supply is tightly fit in and held by the recess and does not make random movements in the recess. When the bottom of the recess or the holder is curved, the holder is easily guided to a predetermined position in the recess for secure engagement.

Furthermore, in accordance with another object of the invention, a cylindrical casing with the oil supply therein is attached to the sharp-edged tool.

BRIEF DESCRIPTION OF THE DRAWINGS

The accompanying drawings illustrate embodiments of the present invention, in which FIG. 1 is a front view of a pair of mowing scissors used to illustrate the present invention;

FIG. 2 is a front view of only the upper handle portion shown by partially cutting away a portion of the mowing scissors of FIG. 1;

FIG. 3 is a partially cut away plan view of the screw portion of the handle of the scissors of FIG. 1;

DETAILED DESCRIPTION OF THE INVENTION

Figure 4:
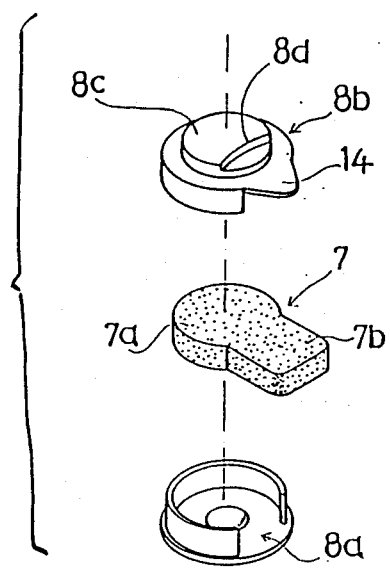
FIG. 4 is an exploded perspective view of an oil supply comprising an oil absorber and a holder of this invention.
Figure 5:
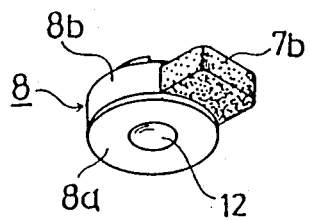
FIG. 5 is a bottom perspective view showing the lower portion of the holder with the oil absorber therein.

A description of the embodiments of the present invention will be made in conjunction with the accompanying drawing.

FIGS. 1 and 3 illustrate the structure of this invention as it is used in a pair of scissors, particularly in a pair of mowing scissors. The blades are axially attached by a screw assembly 3 housing therein a spring charging a lower blade 1 and an upper blade 2 in a discharging direction. An upper handle 4 is secured to the lower blade 1, and a lower handle 5 is provided movably with the upper handle 4 through a machine screw, and these handles 4 and 5 are linked by a linkage 6 to the upper blade 2. In the scissors thus illustrated, a base plate 1a, to which the lower blade 1 is fixed, and the upper handle 4 which are rotatable around an axis extending from the handle toward the edge point, are arranged so that they are fixed is a desired rotated position. In other words, the cutting plane of the blades and the pivoting plane of the handles are variable, and the blades can be set at a desired angle against the handles.

The structure for holding an oil supply in this invention includes an oil absorber 7, a holder 8 which retains the oil absorber 7 therein, and a recess 9 made in the sharp-edged tool. The oil absorber 7 and the holder 8 comprise the oil supply and the oil supply is removably fixed in the recess 9. The oil absorber 7 is made from materials such as felt, sponge, polyurethane foam, on any other fibrous or foamy materials capable of absorbing oil. In the scissors as illustrated in FIGS. 1 and 3, the oil supply is provided on a machine screw 10 to which the upper handle 4 and the lower handle 5 are axially mounted.

The upper handle 4 is formed by molding a synthetic resin material 4b over the outer surface of a core bar 4a so that they are an integral unit. The synthetic resin material 4b, as illustrated in FIG. 2, is molded so that a space in a given form and a centering screw hole 11 are provided to form a recess 9 wherein the holder 8 holding the oil absorber 7 is fit. The recess 9 has a bottom surface that is the outer surface of the core bar 4a. The recess 9 is provided by boring through the synthetic resin material 4b. The recess 9 has a narrow portion 9b wherein a projection 7b of the oil absorber 7 is to be enclosed, the open end of the recess 9 has a wide portion 9c wherein the holder is enclosed. A part of the top wall 9a forming the top surface of the wide portion 9c is cut away so that the upper surface of the holder 8 enclosed therein is partially visible.

The oil absorber 7 and the holder 8, which are to be fit in the recess 9, are shown in FIG. 4. The oil absorber 7 has the projection 7b projecting in one direction from a disc shaped main part 7a so that the whole body of the oil absorber 7 absorbs oil.

The holder 8 includes a main body 8a which is large enough to enclose the main part 7a of the oil absorber 7, and a cover 8b fitting on the main body 8a. The surrounding wall of the holder 8 is partially cut away so that the projection 7b can stick out therefrom when the container 8a and the cover 8b are fitted together.

The bottom of the main body 8a of the holder 8 has a concave area 12 which is to be centrally meshed. The center of the upper surface of the cover 8b has an expanded jutting part 8c, which may be exposed and jutted out through the aforementioned cut away portion formed on the top wall 9a of the recess 9. The expanded and jutting part 8c has a surface which is almost flush to the surface of the top wall of the recess and a step which is to be pinched by a finger.

Figure 6:
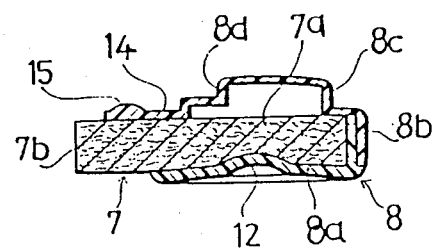
FIG. 6 is a vertical sectional view of the oil supply incorporating the oil absorber of an alternative embodiment.

The concave area 12 on the bottom of the main body 8a is engaged with a convex area 13 projecting from the bottom of the recess 9. In the embodiment illustrated in FIGS. 1 and 3, the head of the machine screw 10 is used as the convex area 13 of the recess for convex/concave engagement between the holder 8 and the recess 9. In addition, the entire bottom surface of the main body 8a may be formed into curved concave shape as shown in FIG. 6.

If the concave area 12 is formed to be equal in thickness to the bottom of the main body 8a, an area which corresponds to the concave area 12 inside of the main body 8a is effectively used to retain the entire body of the oil absorber 7.

The cover 8b of the holder 8 includes a projection 14 formed in the shape of a tongue. This projection 14 serves as a reinforcement when the holder 8 is held in hand while applying oil. Also, because the projection 14 contacts the top wall of the recess 9, the elasticity of the projection 14 prevents the holder 8 from moving randomly within the recess 9. In order for the projection 14 to make contact with the top wall 9a of the recess 9, the projection 14 can be curved upwardly as shown in FIG. 3, or provided with a convex portion 15 as shown in FIG. 6.

Figure 7:
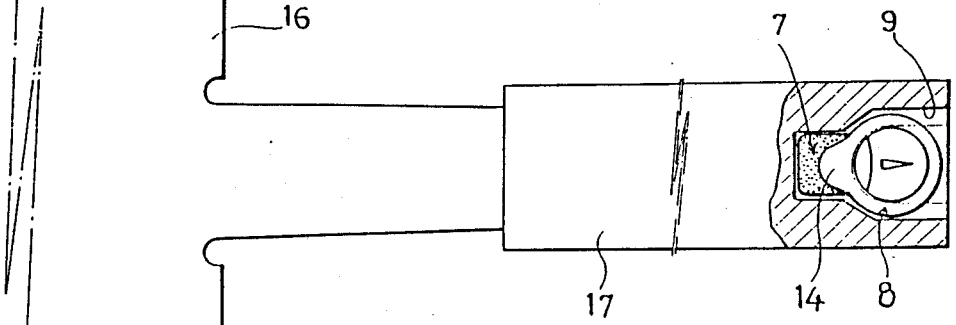
FIG. 7 is a partially cut away plan view showing an embodiment of the present invention applied to a saw.
Figure 8:
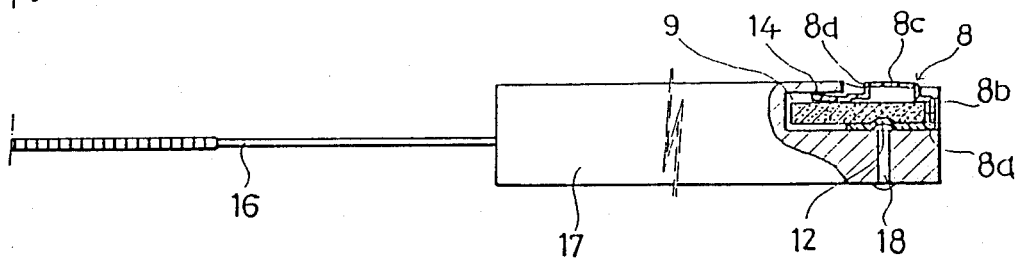
FIG. 8 is a partially cut away front view of the saw of FIG. 7.

FIGS. 7 and 8 illustrate saws using the oil supply of the present invention. The recess 9 is formed at the end of grip handle 17 into which the blade 16 of the saw is inserted. In this embodiment, a convex area to be engaged with the concave area 12 of the holder 8 is formed by inserting a machine screw 18 into the grip handle 17.

Figure 9:
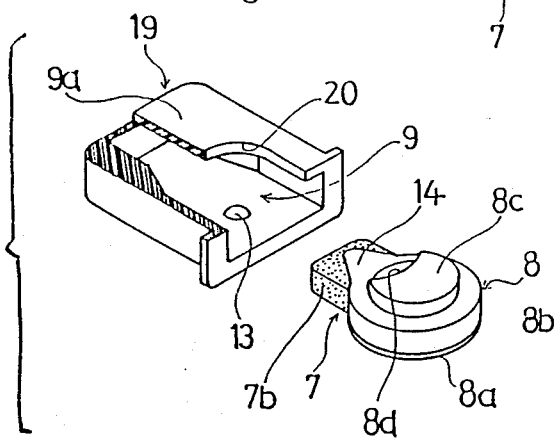
FIG. 9 is a perspective view showing an embodiment which is a combination of the holder and a casing for the holder.

A casing 19, the interior of which is equivalent to the recess 9, can be used instead of forming the recess 9 in the sharp-edged tool, as shown in FIG. 9. The casing 19 of the embodiment shown in FIG. 9 is formed by molding the entire body out of a synthetic resin material into an integral body so that the oil supply as shown in FIGS. 1 and 8 is fitted therein. The entire portion of this casing 19 is therefore formed into an angular body. The upper surface thereof has a U-shaped notch 20 continuous from the open end, and the inner bottom surface thereof has a convex area 13 molded out of synthetic resin material into an integral body.

Figure 10:
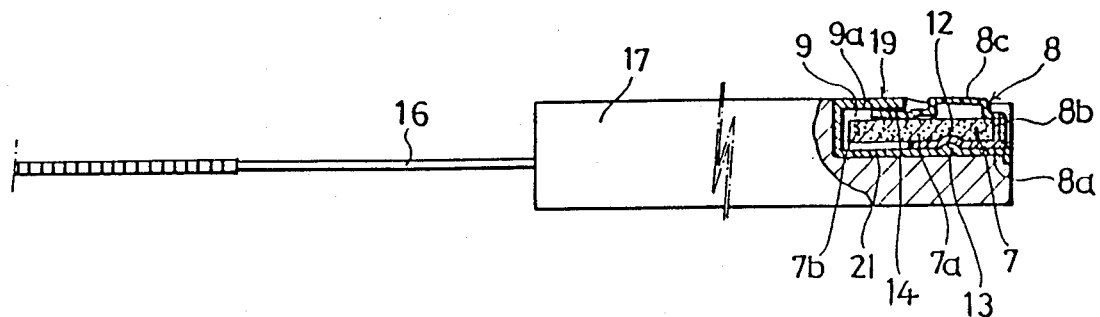
FIG. 10 is a partially cut away front view showing an embodiment of a cylindrical casing and the oil supply applied for a saw.

FIG. 10 illustrates the casing 19 of FIG. 9 installed in the handle of the saw. The end portion of the grip handle 17 is provided with a hollow section 21 which is large enough to securely contain the casing 19 therein. In this case, it is preferable that the shape of the upper surface of the casing 19 is similar to the curved surface of the outer surface of the grip handle 17.

There are certain advantages in using the casing 19: it can eliminate the necessity of the recess; it can prevent the wood portions of the tool, particularly the portions that should not have oil be applied to, from being oiled; and it renders a product, which is homogenized, provided with a fixed condition for meshing the holder body 8 with the recess 9, is easy to use and effective.

The oil supply may be disposed on any portion of the main body of any sharp-edged tool such as at the end part of a handle so that the oil supply will not cause any inconvenience when the tool is used.

Figure 11:
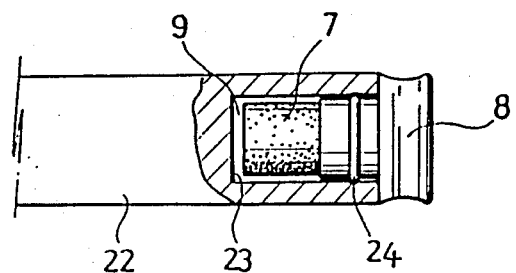

In the embodiment of FIG. 11, a hole 23 is provided in a main body 22, the removably disposed oil supply is tightly sealed by means of concave/convex engagement 24, and the oil supply has the oil absorber 7 at the center.

Figure 13:
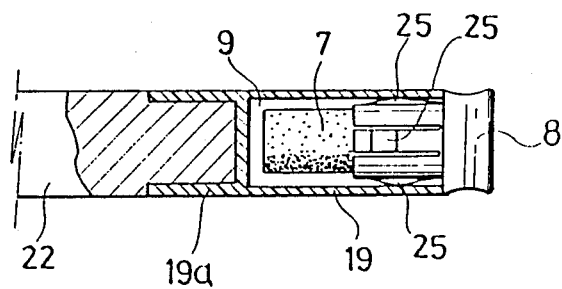
FIGS. 11, 12 and 13 are partially cut away front views of different embodiments, respectively.
Figure 12:
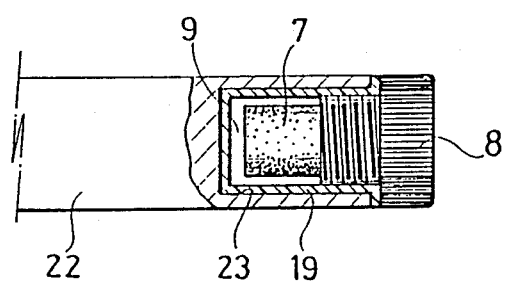

In the embodiment illustrated in FIG. 12, a cylindrical body 19 is fitted in the hole 23 that is provided by boring the main body 22. The oil supply is screwed to the cylindrical body 19. In the embodiment of FIG. 13, the cylindrical body 19 has a cap-like connection 19a at the end opposite the butt end to which the oil supply is attached removably by means of a spring 25. The main body 22 of the sharp-edged tool is inserted into the connection 19a.

The oil absorber in the oil absorber 7 can be regular grade oil. If, however, the oil is satisfactory from the viewpoint of water substitution, cleanliness, rust prevention and has low volatility, it renders the maintenance of the tool more efficient.

As seen from the above description, since the oil supply is disposed removably on a sharp-edged tool, oil can be applied at the user's convenience after the use of the tool. Therefore, the oil supply is very useful for in maintaining the sharp-edged tool, although such maintenance usually tends to be neglected. Additionally, according to the invention, the oil supply can be manipulated by merely touching the upper surface of the holder. Thus, it is easy to remove and attach the oil supply to and from the tool.

Furthermore, the holder is prevented from moving randomly within the fitting recesses of the tool.

The oil supply is easily guided to a predetermined position in the recess, thus being easily manipulated.

With the present invention it is possible to provide a portion of a sharp-edged tool with the oil supply even if it is difficult to attach the oil supply to the sharp-edged tool or there tends to be unnecessary absorption of the oil in the oil absorber. Furthermore, it is also possible to provide a device having consistent quality.

We claim:

1. An arrangement for holding an oil supply in a sharp-edged tool characterized in that said arrangement comprises:

an oil supply including an oil absorber and a holder, said holder holding therein said oil absorber such that at least a part of said oil absorber extends out of said holder, said oil absorber being made from materials which absorb oil; and a recess provided in said sharp-edged tool so that said oil supply is removably set therein, said recess of said sharp-edged tool comprising:

a top wall a part of which is cut away so that a part of the upper surface of said holder can be seen from the outside;

a concave or convex area provided on the bottom surface of said holder;

a convex or concave area provided on the bottom of said recess so that said convex or concave area meshes with the concave or convex area formed on the bottom surface of said holder.

2. An arrangement according to claim 1, wherein a projection in a form of a tongue is formed on said holder, said projection for engaging with the inner surface of the top wall of said recess when holder is set in said recess.

3. An arrangement according to claim 1 or 2, wherein either the bottom surface of said recess or the bottom surface of said holder in concave in shape having a large curvature.

4. An arrangement according to claim 1 or 2 wherein said recess comprises a casing having an inner space for enclosing said holder therein, and said casing is removably mounted to said sharp-edged tool.

5. An arrangement according to claim 3, wherein said recess comprises a casing having an inner space for enclosing said holder therein, and said casing is mounted to said sharp-edged tool.

* * * * *